Feb. 2, 1971 C. W. VIETOR 3,559,481
DESCENT-APPROACH METHOD AND APPARATUS FOR AIRCRAFT
Filed Sept. 8, 1969 2 Sheets-Sheet 1
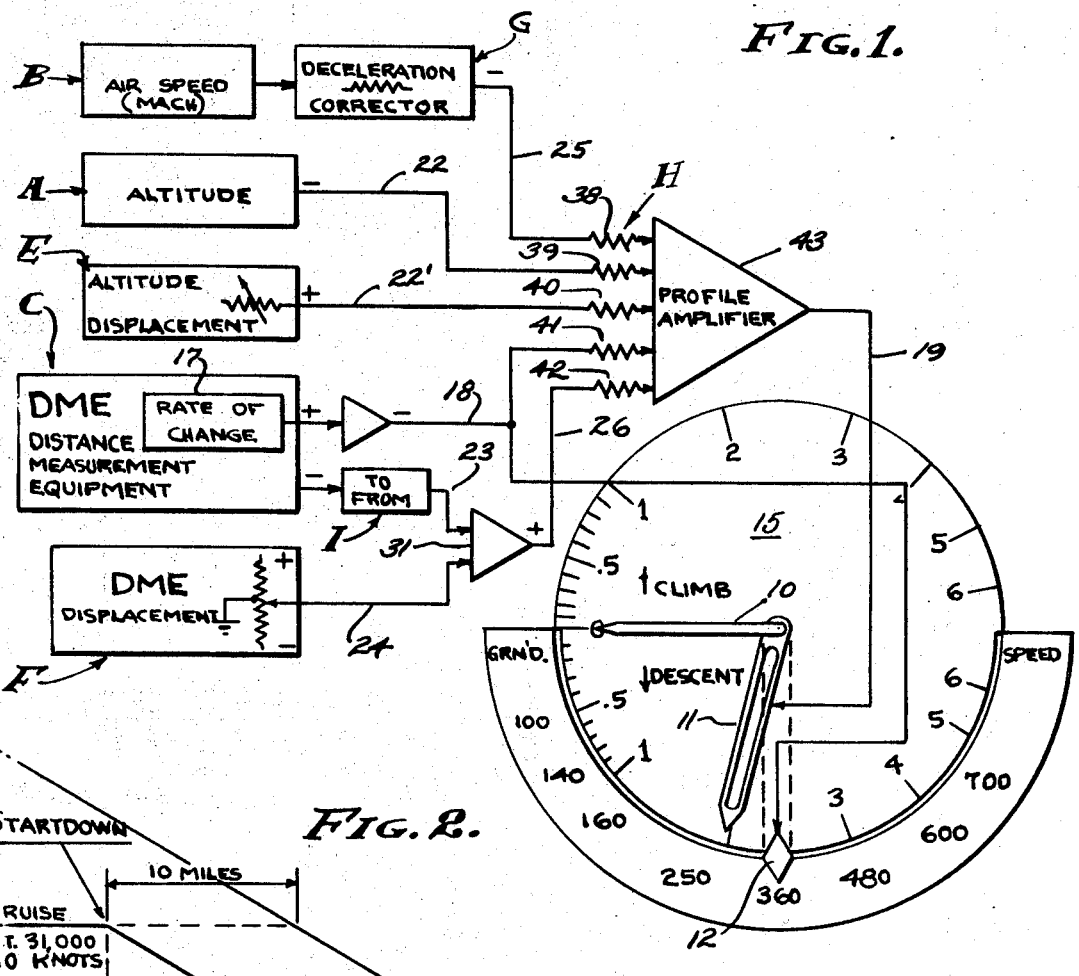
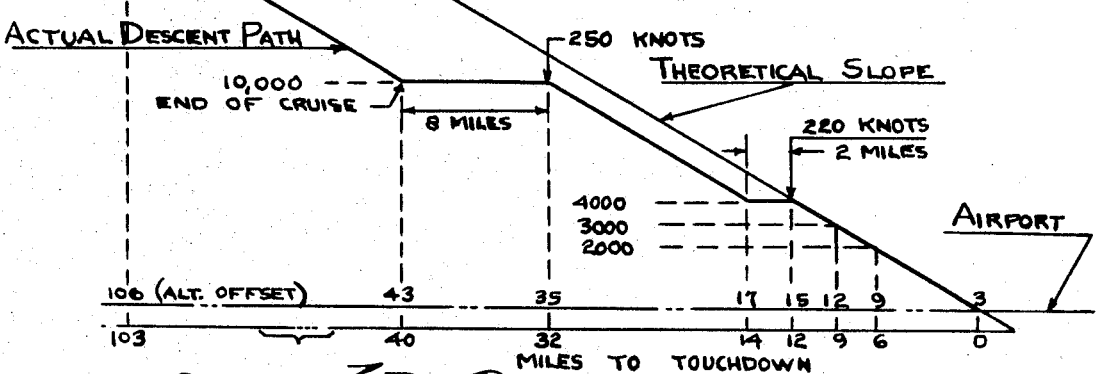
INVENTOR.
CARL W. VIETOR
BY Feb. 2, 1971     C. W. VIETOR     3,559,481
DESCENT-APPROACH METHOD AND APPARATUS FOR AIRCRAFT
Filed Sept. 8, 1969     2 Sheets-Sheet 2
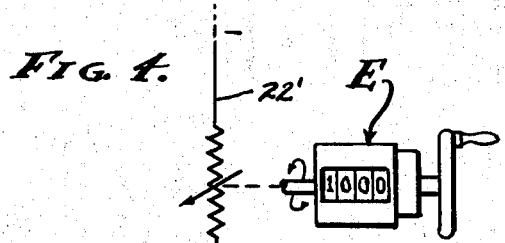
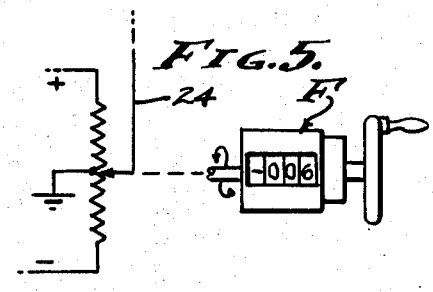
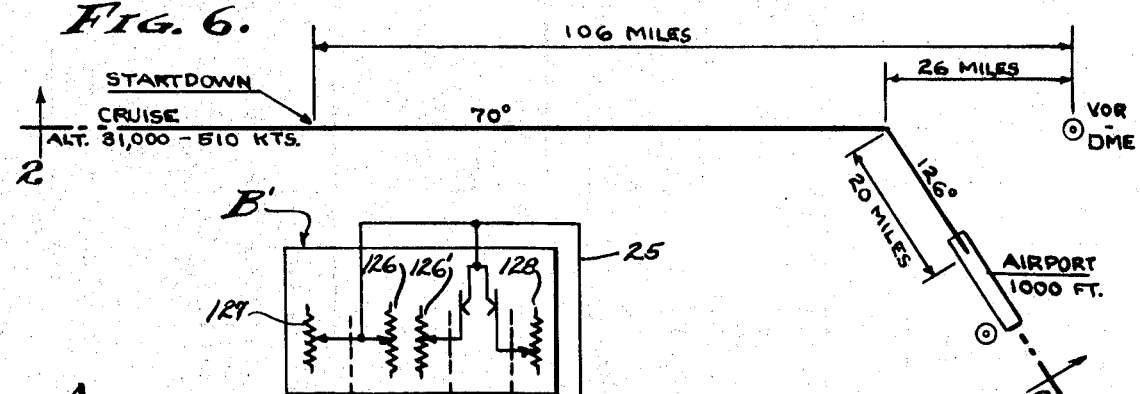
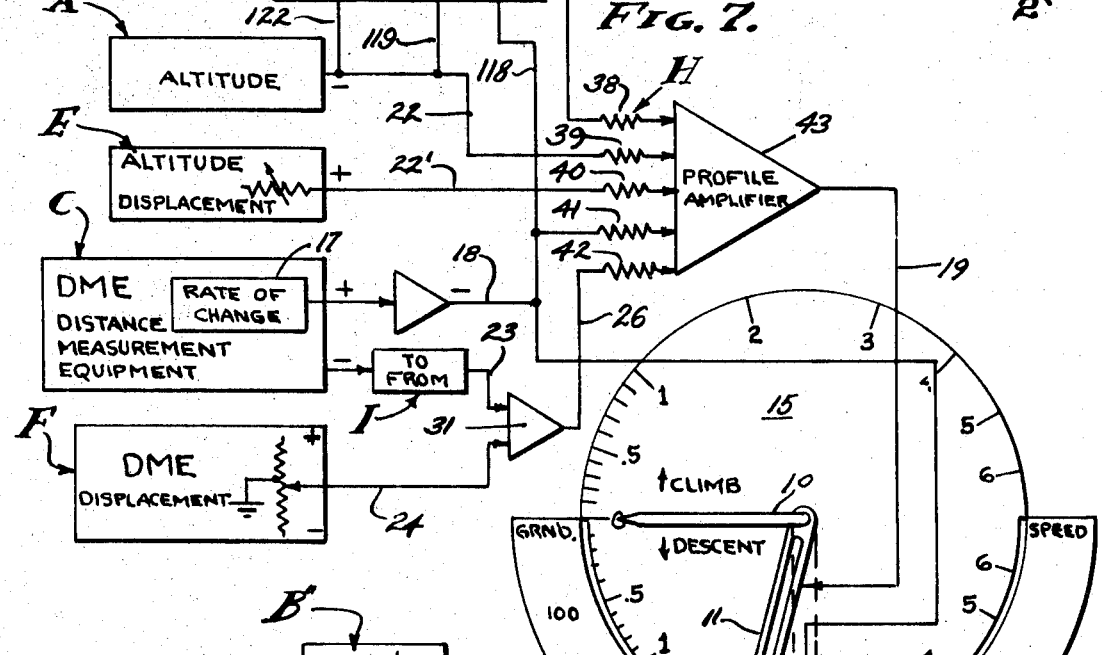
INVENTOR.
CARL W. VIETOR
BY

United States Patent Office 3,559,481
Patented Feb. 2, 1971

3,559,481
DESCENT-APPROACH METHOD AND APPARATUS FOR AIRCRAFT
Carl W. Vietor, 2116 Linda Flora Drive,
Los Angeles, Calif. 90024
Continuation-in-part of application Ser. No. 650,901, July 3, 1967. This application Sept. 8, 1969, Ser. No. 856,018
Int. Cl. G01c 23/00
U.S. Cl. 73—178
12 Claims

ABSTRACT OF THE DISCLOSURE

A method and apparatus that utilizes an altimeter indicator output, a speed indicator or equivalent output and a distance measurement output (to a predetermined point or touchdown) operating an instrument panel indicator or servo control of an aircraft relative to a predetermined descent-approach slope. The method and apparatus operates, for example, from cruise position and speeds through all flight phases to and including touchdown position and speeds, and is a total energy concept employing to greatest advantage the kinetic as well as potential energy referred to hereinafter as "aircraft capability" and programming the same for discriminate use by the pilot.

---

This application is a continuation in part of application Ser. No. 650,901, filed July 3, 1967, issued Feb. 24, 1970 as United States Pat. No. 3,496,769, and entitled Descent-Approach System for Aircraft.

This invention is especially useful in the efficient descent and approach of aircraft to a landing touchdown and provides both a method and apparatus for indicating and controlling the position of an aircraft in the transition from cruise speed to approach speed through to landing configuration followed by accurately predetermined touchdown placement and timing. The method and apparatus involves known components including an altimeter or altitude indicator, an airspeed or speed indicator (in the first form), a distance measurement indicator (DME) and at least one or more novel components hereinafter referred to as an altitude displacement means, a distance measurement displacement means, a deceleration comparator in the second form, a profile amplifier, and a distance measurement integrator amplifier. The system and apparatus operates by feeding the output of the altitude and airspeed or speed indicator (first form), or of the altitude and deceleration comparator (second form), into the said profile amplifier correcting said altitude indicator feed by means of the said displacement means therefor; by feeding the output of the distance measurement indicator into the profile amplifier and correcting said output by means of the displacement means therefor, integrating the information derived and utilizing it in equipment to be described; and by operating a visible instrument panel or instruments or by operating the aircraft directly through servo means, so as to indicate the position of or to control the aircraft relative to a predetermined descent-approach or totally energy slope.

This invention utilizes with utmost efficiency the existence of kinetic energy in the moving mass of the aircraft and of the potential energy in the altitude position attained during cruise. In other words, full advantage is to be realized from the natural flight characteristics of the aircraft, and particularly the larger jet aircraft, whereby a theoretical and/or formula path and the actual descent-approach path of the aircraft can be made to coincide at a predetermined point or at the terminal portion of the descent-approach.

In jet transport operations there have been accidents which involved unsatisfactory letdowns and approaches-to-landing, all of which leads to the conclusion that the instrumentation therefor can be improved. The control characteristics of high speed swept-wing jet aircraft are such that things happen quickly on the flight deck, and the descent-approach and touchdown phase of flight demands of the pilot the ability to pre-plan and control the flight path with utmost care. In practicing the present invention, the various flight characteristics of the jet aircraft are of primary concern and are the factors of this descent-approach system which is dependent upon the kinetic and potential energy inherently involved in the in-flight jet aircraft at the commencement of and throughout the descent-approach phase of flight.

The cruise phase of flight is referred to as two dimensional, but during climbout and descent phases the flight is three dimensional. In climbout no particular point is aimed at, however in the descent-approach phase a given point (a fix or touchdown) is necessarily aimed at and the descent factor renders the phase three dimensional in space. The prior art instrumentation provides nothing to show and/or program the energy in the aircraft, and a pilot must therefore guess his way to the touchdown, so to speak, and his flight planning is complicated by aircraft traffic control (ATC) requirements, such as, for example, to cross a 23 mile DME fix at 7,000 ft. altitude. Obviously, a pilot cannot know immediately whether or not such a requirement is possible, since he does not know by the old instrumentation where he is and where he will be relative to the required fix per se. It is an object, therefore, of the present invention to provide a system whereby, by use of the distance measuring equipment and the basic altitude and speed, and with known flight characteristics of the aircraft, an inertia and slope concept establishes a reference system in three dimensions for the accurate control of the descent-approach flight phase to any predetermined fix and speed and to its infinite conclusion at touchdown. It is to be understood too that the system herein disclosed can be reversely applied to climbout profiles, if so desired.

With the present day family of transport jets the most efficient descent is accomplished by descending on a path that is three miles forward for every thousand feet of descent, offset by the number of miles required to slow from cruise speed to the maximum speed for extending the flaps and which is accomplished at a reasonable altitude before landing. By coincidence this path is also the natural glide path at normal approach speeds, and is also the normal final approach slope that the present day landing aids are adjusted to. In practicing the present invention, and with the pilot oriented concept and present day aircraft instrumentation, the procedure is as follows: The "aircraft capability" for any altitude and speed is determined by resolving the altitude and speed into miles, and to this resolution a displacement factor is added or subtracted as required. The resultant is then compared with the DME reading when the aircraft is at the altitude for which the calculation is made. If the computed number and the DME reading are the same the aircraft is on the actually correct path; if not, an attitude correction is made to bring it onto the actually correct path. The instrument herein disclosed indicates this three dimensional energy path.

It is an object of this invention to automate the above procedure and to display the resulting information for the pilot to use discriminately, or to feed the resulting information into an autopilot so that the aircraft can execute a most efficient descent to a predetermined fix at a predetermined speed or to touchdown. Other systems using the altimeter and the DME have been practiced, however for example, they have created a rigid path and have not considered the present energy concept. Heretofore this energy has been left to the pilot's ingenuity as to how it will be dissipated before reaching a fix at a given speed, or touchdown. In the present invention, this energy is of prime concern and is taken into strict account and is programmed into the flight path of the descent, leaving the pilot the choice of where and when said energy is to be dissipated. For example, if the pilot is required to cross a 20 mile DME fix at 4,000 ft. at 250 knots he can remain at full cruise to 4,000 ft. and then close his throttles so that the aircraft will arrive at the fix at the correct speed. Alternatively he may choose to level off at 10,000 ft. and slow to 250 knots and then descend to 4,000 ft. He will nevertheless arrive at the fix at the correct speed; or stated in accordance with the aircraft capability concept, with the correct amount of energy remaining in the aircraft. The instrument display provided will indicate that the aircraft is on the path in either case, thereby giving the pilot a maximum latitude of discrimination.

Fundamentally, this invention makes it possible to continuously measure the energy in the aircraft relative to a predetermined requirement level, be it "a fix" at "a given speed" or "touchdown," and to display how the energy level of the plane is matching or not matching with the requirements for any altitude or speed throughout the descent. In other words, the concept and instrumentation that will now be described is operative to track and/or plot the required positions of the aircraft, for any instant during the descent-approach, whether the natural and/or actual path of the aircraft is ahead of or behind the theoretical slope. Therefore, it becomes feasible for the pilot to be obedient to aircraft traffic control requirements, since it is possible with the present invention for the pilot to regain his required position relative to the slope, regardless of whether he is above or below an optimum path. Thus, this invention offers tremendous improvements in aircraft traffic control.

The various objects and features of this invention will be fully understood from the following detailed description of the typical preferred form and application thereof, throughout which description reference is made to the accompanying drawings, in which:

FIG. 1 is an electrical block diagram showing a first and typical embodiment of the present descent-approach system and its approach-descent and profile rate indicator which characterizes the same. FIG. 2 is a diagrammatic view of a typical aircraft approach, as indicated and programmed by the present invention and taken as indicated by line 2—2 on FIG. 6. FIG. 3 is a perspective view illustrating the general relationship of the visual indicator means embodied in the instrument shown in FIG. 1. FIGS. 4 and 5 are electrical diagrams of the altitude displacement and DME displacement means respectively, these two means being incorporated in the block diagram of FIG. 1. FIG. 6 is an area view, in the form of a chart, illustrating a typical aircraft descent-approach as it is indicated by and programmed by the system herein disclosed. FIG. 7 is an electrical block diagram similar to FIG. 1 and showing a second embodiment. And, FIG. 8 illustrates portion of the block diagram of FIG. 7 and shows a third embodiment.

In the drawings I have illustrated diagrammatically and graphically the present invention as it is applied with present day aircraft equipment. That is, the known components are those which are being currently used and improved, including an altitude indicator A, a speed indicator B and cooperative deceleration corrector G in the first embodiment of a deceleration comparator B' or B" in the second and third embodiments respectively, and distance measuring equipment C. Elements A, B and C involve known pieces of equipment and are capable of delivering, for example, an electrical signal in the form of a voltage output; the altitude indicator A being corrected for barometric pressure and temperature changes; the speed indicator B being an airspeed or Mach indicator; and the distance measuring equipment C being self-corrective and reliably operative when tuned onto cooperative ground located DME. Therefore, without showing and without describing the details of these three basic pieces of equipment, it is to be understood that they are in each instance used, in carrying out the present invention, as commercially available equipment. In fact, each of these known pieces of equipment are invariably installed and available in a fully instrumented aircraft.

There are generally two ways in which the present invention is to be used. Primarily, it is the instrument panel indication which is sought. Secondarily, it is the auto-pilot control of the aircraft which can be governed. In other words, the information derived from this descent-approach system can be used by the pilot and/or auto-pilot of the aircraft, and in the following description I will refer to the system in its first sense as it relates primarily to presenting an instrument panel indication for discriminate use by the pilot. Therefore, the present invention is characterized by a novel instrument referred to in parent application Ser. No. 650,901 as an approach-descent and profile rate indicator and hereinafter referred to as a profile indicator D which performs every function of a rate-of-climb indicator which it is to replace, and additional functions as well. Therefore, in addition to the usual rate-of-climb and/or descent needle 10, the profile indicator D has a profile needle 11 and a groundspeed-slope pointer 12. It is significant that there are these three cooperative variables, the needles 10 and 11 and the groundspeed-slope pointer 12; and it is when the positions of the needle 11 and pointer 12 coincide that the natural and/or actual and/or energy path of the aircraft is properly related to the predetermined total energy slope at which the aircraft must be properly oriented in order to accomplish an efficient descent-approach. This is then accomplished by changing the attitude of the aircraft so that the rate of climb and descent needle 10 is over the same position as needle 11 and pointer 12, thereby effecting a cooperative relationship between all three movable elements 10, 11 and 12. In accordance with the invention, therefore, the profile indicator D involves, generally, a rate of climb and descent responsive means X, a profile responsive means Y, and a slope responsive means Z; and all of which are cooperatively combined in one case having calibrations relative to which the elements 10, 11 and 12 operate for comparative observation by the pilot.

The rate of climb and descent responsive means X is a usual rate of climb and descent indicator of the type commonly employed in aircraft. Such an indicator involves a visible fixed card 15 of circular configuration, over which the centrally pivoted needle 10 turns. The card 15 is calibrated for the number of feet of climb or descent, in opposite directions from a "0" point located horizontally to the left of the card 15, the rate of climb being above the "0" in a clockwise direction, and the rate of descent being below the "0" in a counter clockwise direction.

The needle 10 is therefore at "0" when the aircraft is inertially at rest (level flight) in this respect. In practice, the rate of climb and descent needle 10 is a single bar, so as to be readily distinguishable from the profile needle 11 which is a double bar. The drive 16, such as a selsyn motor is indicated, the rate mechanism being of the usual construction (not shown) either remote or built into the instrument per se as circumstances require. It will be understood how a usual instrument mechanism can be employed to properly position the needle 10.

The profile responsive means Y involves among other things later to be described, a speed indicator B (see FIG. 1) and preferably a usual airspeed indicator of the available type. For example, it is common to have a corrected airspeed indicator and it is also possible to have a true groundspeed indicator as a result of the functions that are available from the distance measuring equipment and in this respect I refer to computerized DME information that indicates the true groundspeed. It is to be understood that there are various known ways and means by which to arrive at a signal representing true groundspeed, and any one of such ways and means can be employed in practicing this invention. Therefore, when reference is made to a "speed indicator," it is to be understood that a "groundspeed indicator" can be employed, as circumstances require.

The deceleration corrector G that cooperates with the speed indicator B is a programmed means which recognizes the deceleration characteristics of aircraft in the family thereof under consideration. For example, typical present day jet aircraft decelerate from cruise speed to flap speed in a horizontal flight and still air at 10,000 ft. altitude (at landing weights) in a distance of 10 miles, when at idle thrust. Therefore, the deceleration corrector G receives the voltage output of the speed indicator B and has an output that is set to go to a zero voltage when the aircraft slows to predetermined minimum or flap speed, for example 220 knots airspeed (or equivalent Mach). As shown, the deceleration corrector G has an output line 25 that has a negative voltage effective so as to prolong the theoretical glide path a distance equivalent to that which is required for a normal slow-down from a cruise to said flap speed. As shown, in its preferred form the programmed deceleration corrector G is simply a fixed voltage means that charges the output line 25 that feeds into an amplifier 43.

A specific example of an alternate for the above described indicator B and deceleration corrector G combination is the second embodiment shown in FIG. 7 wherein a deceleration comparator B' is used. All other elements and relationships of the system can remain the same except that a basic factor signal is channeled to the deceleration comparator B' through a line 122 from the altitude indicator A and a corrective signal is channeled thereto through a line 118 from the DME rate of change indicator 17, and all of which is processed for the establishment of a distance offset or slow-down factor signal that then feeds into the summator H. In this form of the invention, the altitude information through line 122 provides the fundamental basis for establishing a deceleration factor from cruise speed to maximum flap speed in still air and which varies as a function of altitude. In this respect, graphic curves are developed and established for each particular aircraft, and namely one a cruise speed curve (usually in Mach number) that gives the true airspeed for a given altitude, and namely another a maximum flap speed curve (usually in airspeed) that gives the true airspeed for a given altitude. These two curves are related and the functional difference between the two is proportionate to distances at operational altitudes to show the distance factor necessary for slow-down of the particular aircraft involved, and to this end a deceleration factor is established (for the particular aircraft involved) and which varies with altitude and which is correct for still air and/or normal conditions.

A typical circuit for establishing this standard deceleration factor is illustrated in the deceleration comparator B' wherein there are three variable voltage means, one a pair of variable resistances 126, and 126' each having the characteristics of the cruise speed curve for example a Mach .85 curve for all altitudes, a second a variable resistance 127 having the characteristics of the maximum flap speed curve for example a 220 indicated airspeed curve for all altitudes, and a third a variable resistance 128 having the characteristics of known groundspeed. The resistances 126, 126', 127 and 128 are powered or biased by suitable power supplies (not shown) and in each instance to establish the high, low and variable signals therebetween. The cruise speed (126) Mach .85 curve is in practice a straight line function, and although the maximum flap speed (127) 220 IAS is a true curve it is for all practical purposes a straight line function and is treated as such. In accordance with the invention, the basic altitude function is to affect the variable output of resistances 126, 126' and 127, and to this end the altitude information through line 122 simultaneously and correspondingly shifts the output of the resistances 126 and 127 and collects them to be fed through line 25 (shown diagrammatically in FIG. 7). The resistance 126' is affected simultaneously by the altitude information, as shown. As hereinabove stated, the cruise speed in Mach .85 (or other Mach value) represents true airspeed and for all practical purposes for all altitudes, and therefore the above described affect of the altitude information through line 122 correspondingly affects the variable resistances 127 representing the function of an indicated airspeed (and close approximation thereof even at low altitudes) to which known groundspeed can be related so as to establish any differential or offset which may exist. In this latter respect therefore, the rate of change information of the rate indicator 17 through line 118 shifts the output of the resistance 128 and collects it and the separately affected output resistance 126', for comparison, and feeds the resultant through line 25 (shown diagrammatically in FIG. 7), for correction of the still air signal derived from the balance between resistances 126 and 127. Thus, the slow-down to flap speed and the winds which invariably offset the aircraft speed are automatically compensated for.

In FIG. 8 the third embodiment is shown wherein a deceleration comparator B" is used. Again, all other elements and relationships of the system can remain the same except that the basic factor signal is channeled to the deceleration comparator B" through the line 118 from the DME rate-of-change indicator 17, and a correction signal if any (not shown) is channeled thereto through the line 122 from the altitude indicator A. In this form of the invention, there is a variable resistance 129 having the characteristics of slow-down for the particular aircraft involved at certain known groundspeeds (the same as 128), and which for all practical purposes can be fed into the summator H without further processing. The basic groundspeed function through line 118 shifts the output of resistance 129 and collects it to be fed to the summator (shown diagrammatically in FIG. 8). In practice, the resistance 129 is operable between 800 and 220 knots groundspeed and automatically compensates for slowdown distance required at indicated groundspeed.

The slope responsive means Z directly utilizes the voltage output of the rate of change indicator 17 which is part of the distance measuring equipment C, through a line 18, and this voltage is used to position the groundspeed-slope pointer 12 which involves a geometrical configuration which is readily distinguishable from the two needles 10 and 11. In practice, a diamond shaped pointer 12 is provided and which moves within the descent calibrations of the card 15 to indicate the true groundspeed as well as to indicate the correct rate of descent required in order to remain on the correct slope. The groundspeed-slope pointer 12 operates concentric with the needles 10 and 11, the inner point thereof being registerable with the point of the profile needle 11 and the outer point thereof being operable within a range of groundspeed calibrations 19 fixedly engraved, or the like, in the peripheral bezel portion of the instrument case.

In accordance with the invention the groundspeed-slope pointer 12 is responsive solely to the output of the DME rate of change indicator 17 from output line 18. However, the profile needle 11 is responsive to the integrated output of the combined variables including: said rate of change voltage from output line 18; the output of the altitude indicator A, the output of the speed indicator B or of the deceleration comparators B' or B", and the output of the distance measuring equipment C. Further, the variables integrated and fed to the drive for the profile needle 11 includes, the output of an altitude displacement means E and the output of a distance measurement equipment displacement means F. Finally, the deceleration variable output is included in the said integration, reference being made to the output of the deceleration corrector G and deceleration comparators B' or B"; and all said variables being processed by a summator H having a single output line 19 to the drive 20 of the profile needle 11. The drive 20 can vary as circumstances require and in its basic form can be considered to be a voltage responsive meter-type instrument or selsyn motor capable of advancing and/or retracting the needle 11 dependent upon the voltage applied. Similarly, a drive 21 for placing the groundspeed-slope pointer 12 can be considered the same, as a voltage responsive meter-type instrument or selsyn motor capable of advancing and/or retracting the pointer 12 dependent upon the voltage applied.

The altitude indicator A is of the usual available type, being corrected for barometric and temperature variations, and provided with a transducer or the like so as to convert pressure indications into voltage signals. The altitude indicator A has an output line 22 that parallels the output line 18 above described.

The altitude displacement means E is a manually adjustable means which enables the pilot to compensate for the altitude of the airport or required fix point. This means E can affect the transducer output of the altitude indicator A directly or indirectly and is shown as a variable voltage means that has an output line 22' that parallels the output line 18 of the DME rate of change indicator 17. The output of the altitude indicator A is shown as a negative voltage, in which case the output voltage of the displacement means E is a positive voltage, controlled as by means of a variable resistor positioned by means of a manually adjustable counter (see FIG. 4) in order to add the height of the fix or airport-touchdown point, giving it a corrected placement above sea level.

The distance measurement equipment displacement means F is a manually adjustable means which enables the pilot to compensate for the horizontal offset of the airport or touchdown or fix point relative to the VOR and DME station to which the aircraft instrumentation is tuned. This means F can affect the distance measurement equipment C directly or indirectly and is shown as a variable voltage means that has output line 24 that parallels the output line 23 of the distance measurement equipment C. The output of the distance measurement equipment C is shown primarily as a negative voltage with a TO-FROM corrector I adapted to reverse the polarity dependent upon the VOR-DME station location. Likewise, the displacement means F is adjustable for both positive and negative output, dependent upon whether, for example, the VOR-DME station is before or beyond the theoretical or actual touchdown point. The positive or negative output of the DME displacement means F is controlled as by means of a variable potentiometer positioned by means of a manually adjustable counter (see FIG. 5). For example, means F is set at null when the descent path terminates at the VOR-DME station. However, when the VOR-DME station is offset from the termination of the descent path, or a specific fix point at a required speed is aimed at during descent, such as for example the 20 mile DME fix at 6,000 ft. at 250 knots, then the means F is adjusted accordingly.

From the foregoing it will be seen that the variable factors are available basically from the existing aircraft instruments, being produced as variable voltages, and which are adjustably affected by the displacement means E and F and fixedly by the corrector means G or variably by the deceleration comparators B' and B". In practice, the combined instrument controlling voltages from the said means is a minus voltage, and dependent upon the capability of each of the various instruments gain amplifiers can be employed as indicated. For example, I employ a gain amplifier 31 in the output lines 23 and 24 collectively, so as to consolidate the combined results thereof in one DME related signal voltage into a single output line 26. As shown, the output lines 18, 22, 22', 25 and 26 are fed into the summator H where they are properly balanced relative to each other by means of parallel resistors 38, 39, 40, 41 and 42, or the like, which collectively feed into a profile amplifier 43 that powers the means that motivates the profile needle 11. As hereinabove described, the needle 11 is positioned as by means of a selsyn motor 20 that is responsive to the variable voltage and thereby places said needle.

A typical in-flight operation of the descent-approach system hereinabove described is as follows: assume that a typical present day jet passenger transport aircraft is at cruise speed and at an altitude of 31,000 ft. approaching runway 12 of an airport, and that the aircraft is on a heading toward an omni range station equipped with distance measuring equipment, and which is located at a substantially offset distance relative to said airport. For example, such a situation is illustrated in FIG. 6 wherein the aircraft heading is 70° on a track line to the VOR and which intersects a 126° approach at a point 20 miles preceding touchdown. Referring to FIG. 2, both the theoretical slope and the natural and/or actual descent path of the aircraft are shown, the field altitude being 1,000 ft. and the DME being relatively 6 miles beyond touchdown (26 miles beyond the intersection), FIG. 2 being a diagram taken as indicated by line 2—2 on FIG. 6 through two angularly related planes as the aircraft executes a right turn through the intersection away from the VOR track and toward the airport and touchdown point.

In executing the descent-approach plan as above set forth, a descent of 1,000 ft. per each three miles with the airport altitude displacement of 1,000 ft. requires 90 miles; the slow-down from cruise speed to flap speed requires 10 miles; and the DME displacement is 6 miles additive; the summation of these distances being 106 miles and the DME reading that will be required at the point of startdown. Operationally, the distance measuring equipment is (at present) reliably operative at 200 miles from the station to which it is tuned, and 106 miles is well within these limits. Therefore, the profile indicator D is operative to properly position the profile needle 11 and groundspeed-slope pointer 12 well in advance of the startdown point. In practice, the groundspeed-slope pointer 12 is responsive to indicate groundspeed that is directly related to the predetermined slope or descent rate for the groundspeed that is indicated and consequently indicates both these functions; while the profile needle 11 is responsive to the integrated summation of the aforementioned variables, and in the initial phase before reaching the startdown point indicates a lesser value (a position clockwise to the left of the groundspeed-slope pointer 12) than the groundspeed-slope pointer 12. During this approach to startdown the rate of climb and/or descent will be indicated as "0" by the needle 10 and as the startdown point is approached the profile needle 11 will progressively move toward the groundspeed-slope pointer 12. Finally, upon a coincident positioning of needle 11 with the groundspeed-slope pointer 12 the aircraft has reached the optimum startdown point, at which time the pilot can properly decrease power and commence the actual descent-approach procedure which is continuously related to the theoretical slope by descending at the rate indicated by the coincident positioning of the needle 11 and the pointer 12.

Following the initiation of startdown, the aircraft will continue at cruise speed along a path well below and parallel to the theoretical slope, during which time the profile needle 11 and groundspeed-slope pointer 12 are maintained coincident with each other. If the profile needle 11 indicates a greater rate of descent than the groundspeed-slope indicator 12 the aircraft altitude is too great as it is related to the remaining distance to which the system has been adjusted, and conversely if the profile needle 11 advances toward "0" ahead of the groundspeed-slope pointer 12 the aircraft altitude is too little as it is related to said remaining distance, all relative to the optimum path related to the theoretical slope. Upon reaching 10,000 ft. altitude where maximum speed is limited to 250 knots, the power is reduced to idle thrust and the in-flight attitude is made horizontal, whereupon the required slow-down takes place; and after which the natural and/or actual glide path is resumed (3° for example) and in which case the aircraft continues at reduced speed along a path still below and parallel to the theoretical slope, the profile needle 11 remaining coincident with the groundspeed-slope pointer 12 which has now moved to show a lesser descent rate indicatively coincident with the groundspeed.

On final approach to the airport and/or touchdown point the slowdown procedure is repeated (idle thrust-horizontal flight). In order to consumate deceleration to flap speed, say for example 220 knots. From this point on to touchdown the normal application of flaps is made along the theoretical slope which is now coincidental with the natural and/or actual glide path of the aircraft. It will be apparent that the profile needle 11 is to remain coincidental with the groundspeed-slope pointer 12, and this will be the case until the track of the aircraft deviates from the VOR-DME station to which the instrumentation is tuned. However, it is to be understood that offset omni range equipment is available and which is computerized so as to vector in on laterally displaced stations, and to the end that DME readings and functions are available to and including the touchdown point. As illustrated in FIG. 6 a second VOR-DME station located at the airport can be tuned to, after executing the right turn at 6,000 ft., and in which case the system is operative to touchdown.

As hereinabove described, it is the "aircraft capability" or total energy which is indicated and programmed by this descent-approach system. The formula which prevails during operation of the type of aircraft under consideration and this related system is, for example, as follows:

$$\text{Aircraft capability} = S\left(\frac{A}{1,000}\right) + K\sqrt{\left(\frac{dD}{dT}\right)} - Fs$$

wherein S is the slope constant, A is the altitude, K is the aircraft slow-down factor or conversion constant, D is the distance, T is time, $d$ is instantaneous rate of change, and $Fs$ is the flap speed. It is to be understood that displacement of altitude and distance are made by the adjustments hereinabove described. The "aircraft capability" is represented generally in said basic formula wherein the slope times the altitude is divided by 1,000 and to which is added the aircraft slow-down factor or conversion constant times the square root of the groundspeed minus the flap speed. Fundamentally therefore, the "aircraft capability" is the total energy available in said aircraft by virtue of its total in-flight condition and which includes the kinetic as well as potential energy in said aircraft, primarily at start of descent and secondarily entirely through the descent-approach. And, it is said "aircraft capability" which is represented by the position of the profile needle 11 and which is maintained coincidental with the groundspeed-slope pointer 12 by the pilot and/or autopilot for the execution of optimum and thereby most efficient descent-approach.

Since $dD/dT$ is a function of DME readout and the aircraft may or may not be pointed directly at or away from the VOR-DME during all phases of the descent-approach, a compromise is required to give directional flexibility to the aircraft. Therefore, the airspeed or Mach is used and slow-down functions of the deceleration corrector G are programmed as if in still air. When offset omni equipment is used in conjunction with the described invention the slow-down factor can be programmed as a function of groundspeed as shown in the formula. Or the slow-down factor can be computed for the altitude of the aircraft, by means of the deceleration comparator B'.

It will be observed that both the groundspeed-slope pointer 12 and profile needle 11 respond in position to the rate of change signal through line 18 from the distance measuring equipment C. Consequently, the pointer 12 and 11 would coincide in position if it were not for other factors which must be introduced; namely altitude, remaining distance and slow-down factors and adjustments and variations thereof. It is significant that the basic and controlling factors are derived from the efficient and reliable instrumentation available in aircraft with virtually no modification thereof, and with the provision of a read-out that is advantageously incorporated into one of the well-known and reliable existing aircraft instruments; namely the "climb and descent indicator" and which is now referred to additionally as a "profile indicator D." In all instances, the apparatus is responsive to the altitude and distance to station positions of the aircraft relative to sea level and DME station from which the remaining distance and groundspeed are derived; and the groundspeed-slope pointer 12 will invariably indicate the required positioning of the profile needle 11 for placing the aircraft upon the predetermined ideal and proper descent-approach slope. As a result, the "total energy" concept is exploited, utilizing in-flight "aircraft capability" and which is programmed for instrument display use by the aircraft pilot and/or autopilot as the case may be.

Having described only a typical preferred form and application of my invention, I do not wish to be limited or restricted to the specific details herein set forth, but wish to reserve to myself any modifications or variations that may appear to those skilled in the art.

I claim:

1. Instrumentation for the control of aircraft to a predetermined point along a sloped flight path and including:
    (a) distance measurement equipment having a remaining distance means producing an output signal;
    (b) said distance measuring equipment having a rate of change of distance means producing an output signal and with means responsive thereto to position a groundspeed-slope pointer;
    (c) an altitude detecting means producing an output signal;
    (d) a variable deceleration means producing an output signal;
    (e) summation means combining the remaining distance means output and rate of change of distance means output signals with said altitude detecting means output signal and with said deceleration means output signal into a control signal;
    (f) and drive means responsive to said control signal and positioning a profile needle, whereby the relative positions of the groundspeed-slope pointer and profile needle are comparable for pilot control of the aircraft.

2. The aircraft control instrumentation as set forth in claim 1 and wherein the output signal of the deceleration means is determined by means responsive to the output signal of the altitude detecting means.

3. The aircraft control instrumentation as set forth in claim 1 and wherein the output signal of the deceleration means is determined by means responsive to the output signal of the rate of change of distance means.

4. The aircraft control instrumentation as set forth in claim 1, wherein the output signal of the deceleration means is determined by the difference between the output of a cruise speed simulating means responsive to and output-controlled by the output signal of the altitude detecting means and the output of a predetermined permissive speed simulating means also responsive to and output-controlled by the output signal of the altitude detecting means, and wherein the said output signal of the deceleration means is corrected for other than still air conditions by a signal producing means responsive to the output signal of the rate of change of distance means.

5. A method for navigating an aircraft relative to a theoretical slope flight path wherein the aircraft is subjected to a remaining distance factor to a predetermined point, a rate of change of distance factor, and an altitude factor, and including the steps of:

summating the said remaining distance factor with an aircraft slow down factor, said rate of change of distance factor, and the said altitude factor, each according to its effect to establish a summation factor determining remaining aircraft capability of said aircraft in distance to said predetermined point;

and adjusting the rate of change in altitude of said aircraft according to the difference between the value of said remaining distance factor and the value of the said summation factor and thereby determining position of and to navigate said aircraft along said theoretical slope flight path.

6. The method of navigating an aircraft relative to a theoretical slope flight path as set forth in claim 5 and wherein a positive or negative distance displacement factor is summated with said other factors according to its effect to establish the said summation factor, whereby the remaining distance to and from a position along the flight path is compensated for.

7. The method of navigating an aircraft relative to a theoretical slope flight path as set forth in claim 5 and wherein an altitude displacement factor is summated with said summation factor, whereby the altitude at a position along the flight path is compensated for.

8. The method of navigating an aircraft relative to a theoretical slope flight path as set forth in claim 5, wherein an altitude displacement factor is summated with said other factors according to its effect to establish the said summation factor, whereby the altitude at a position along the flight path is compensated for, and wherein a positive or negative distance displacement factor is summated with said other factors according to its effect to establish the said summation factor, whereby the remaining distance to and from a position along the flight path is compensated for.

9. A method for navigating an aircraft relative to a theoretical slope flight path wherein the aircraft is subjected to a remaining distance factor to a predetermined point, a rate of change of distance factor, an altitude factor, and a variable deceleration factor, and including the steps of:

summating the said remaining distance factor with an aircraft slowdown factor, said rate of change of distance factor, said altitude factor, and said variable deceleration factor, each according to its effect to establish a summation factor determining remaining aircraft capability of said aircraft in distance to said predetermined point;

and adjusting the rate of change in altitude of said aircraft according to the difference between the value of said remaining distance factor and the value of the said summation factor and thereby determining position of and to navigate said aircraft along said theoretical slope flight path.

10. The method of navigating an aircraft relative to a theoretical slope flight path as set forth in claim 9 and wherein the said variable deceleration factor is determined in value by the magnitude of the said altitude factor.

11. The method of navigating an aircraft relative to a theoretical slope flight path as set forth in claim 9 and wherein the said variable deceleration factor is determined in value by the magnitude of the said rate of change of distance factor.

12. The method of navigating an aircraft relative to a theoretical slope flight path as set forth in claim 9, wherein the said variable deceleration factor is determined in value by the difference between cruise speed of said aircraft at an altitude and a predetermined permissive speed of said aircraft at the said altitude, and wherein the said variable deceleration factor is corrected in value for other than still air conditions by a factor determined in value by the magnitude of the said rate of change of distance factor.

References Cited

UNITED STATES PATENTS

| | | | |
|---|---|---|---|
| 3,165,745 | 1/1965 | Pike et al. | 340—27 |
| 3,307,191 | 2/1967 | Crane | 73—178 |

DONALD O. WOODIEL, Primary Examiner